United States Patent [19]

Perronin et al.

[11] 3,991,007

[45] Nov. 9, 1976

[54] PROCESS FOR THE PREPARATION OF PIGMENTARY PARTICLES COATED WITH AN ORGANIC POLYMER AND COMPOSITIONS RESULTING THEREFROM

[75] Inventors: Jean Perronin, Chantilly; Bernard Jean Robert Gurtner, Creil, both of France

[73] Assignee: Produits Chimiques Ugine Kuhlmann, Paris, France

[22] Filed: June 11, 1974

[21] Appl. No.: 478,424

[30] Foreign Application Priority Data

June 20, 1973 France .............................. 73.22418

[52] U.S. Cl. ..................... 260/42.14; 106/308 Q; 106/309; 427/221; 428/500; 260/42.21
[51] Int. Cl.$^2$ ..................... C09C 3/10; C08L 23/00
[58] Field of Search ......................... 106/308, 309; 260/42.14, 42.21; 117/100 B, 100 A; 427/221, 340; 428/500

[56] References Cited
UNITED STATES PATENTS

| | | | |
|---|---|---|---|
| 3,519,593 | 7/1970 | Bolger | 106/508 Q |
| 3,590,018 | 6/1971 | Gebara | 260/42.14 |
| 3,661,620 | 5/1972 | Dehking | 260/42.14 |
| 3,773,708 | 11/1973 | Takahashi et al. | 106/308 Q |
| 3,826,670 | 7/1974 | Rees | 106/308 Q |

Primary Examiner—Patrick P. Garvin
Assistant Examiner—J. V. Howard
Attorney, Agent, or Firm—Beveridge, DeGrandi, Kline & Lunsford

[57] ABSTRACT

A process for the preparation of pigmentary compositions which comprises coating the particles of pigment by means of a polymer or copolymer, by covering by the polymerisation or copolymerisation "in situ" of at least one ethylenically unsaturated monomer having at least one polymerisable double bond and containing at least three carbon atoms or at least two carbon atoms and a heteroatom and/or a halogen atom attached to one of the carbon atoms wherein the polymerisation or copolymerisation reaction is effected in a medium comprising at least one organic solvent in which the monomer is soluble, and in the presence of at least one polymerisation catalyst soluble in this medium, the monomer and the proportion thereof being selected so that the polymer or copolymer formed is insoluble in the organic solvent used, the ratio by weight of pigment to resin being from 10/90 to 95/5 and the amount of catalyst being from 0.1 to 10% with respect to the weight of the monomer to be polymerised; and pigmentary compositions obtained by this process.

18 Claims, No Drawings

PROCESS FOR THE PREPARATION OF PIGMENTARY PARTICLES COATED WITH AN ORGANIC POLYMER AND COMPOSITIONS RESULTING THEREFROM

The present invention relates to a process for the preparation of pigmentary particles coated with an organic polymer and compositions resulting therefrom.

The use of pigments, that is, dyes insoluble in any medium, is much in demand in fields of application as varied as plastics, inks, textiles, paints, and cosmetics, to mention only the principal of these. For this purpose, it is advantageous to be able to prepare these pigments in the most finely divided form possible. With this object it has been proposed to disperse the pigments mechanically in the presence of one or more surface-active agents, in a medium compatible with that of their subsequent use. This method of procedure has numerous disadvantages, for example, on account of the frequent incompatibility of the surface-active agents, present in a very high proportion, with the medium used in the later application. The most serious disadvantage to the user, however, lies in the need to employ considerable mechanical forces often for very long times.

It has also been proposed to coat the pigment particles with a solid layer isolating them from one another and thus preventing any reagglomeration; this protective layer can subsequently be removed by solution or partial solubilisation. This solid protective layer also called "coating" must be compatible with the other components of the application medium and must not modify the mechanical characteristics of the end product, whether it be in the form of foils or sheets, threads, films or in bulk.

These protective coatings may be produced by various methods. For example, the coating material in liquid form may be ground with the pigmentary particles to be covered (U.S. Pat. No. 3,054,751). In this case only an incomplete coating is obtained in which the pigments or agglomerates adhere to the solid starting material particles.

Another method consists in applying the protective coating by precipitation around each particle from a solution (U.S. Pat. No. 3,409,585 and German Patent No. 2,113,090). It is often difficult, however, even impossible, to eliminate all trace of solvent and to prevent an undesirable reagglomeration.

The most advantageous method consists in adding the pigment to a raw material intended to be polymerised so as to produce a protective layer in situ. Thus, there is obtained in a single stage what was effected in two stages in the previous techniques, namely, the preparation of the polymer and the actual coating. According to this method, it has first been proposed to carry out a coating polymerisation "in bulk" in the absence of any solvent or diluent (U.S. Pat. No. 2,876,133); the pigment composition obtained, however, according to this process is heterogeneous and contains numerous pigment agglomerates. In order to correct this disadvantage, it has been proposed to carry out the coating in an aqueous medium by emulsion or suspension polymerisation (U.S. Pat. Nos. 3,133,893, and 3,544,500 and French Patent No. 1,330,500.). Then problems are met with which relate to the uniform dispersion of the pigment. If the finely divided character of the pigment is not maintained in the course of the application of a coating thereon, only a solid mass of pigment is obtained in which the particles are stuck together by means of the coating substance and which cannot be used industrially. On the other hand, according to the nature of the pigment, it is necessary to use large quantities of surface-active substances in order to ensure an effective polymerisation in emulsion or suspension around each pigment particle while maintaining a fine dispersion of the latter. These surface-active agents cause poor attachment of the protective layer to the pigment particles.

It has now been found that these disadvantages in the process of coating the pigmentary particles by polymerisation or copolymerisation in situ of at least one ethylenically unsaturated monomer having at least one polymerisable double bond and containing at least three carbon atoms or at least two carbon atoms and a heteroatom and/or a halogen atom attached to one of the carbon atoms can be remedied if the polymerisation or copolymerisation reaction is carried out in a medium containing at least one organic solvent, in which the monomer is soluble and in the presence of at least one polymerisation catalyst soluble in this medium.

In these conditions, it has been unexpectedly found that the coating is easily carried out without being obliged to call on complex processes or to use surface-active substances.

According to the present invention therefore a process is provided for the preparation of pigmentary compositions which comprises coating the particles of pigment by means of a polymer or copolymer, by covering by the polymerisation or copolymerisation in situ of at least one ethylenically unsaturated monomer having at least one polymerisable double bond and containing at least three carbon atoms or at least two carbon atoms and a heteroatom and/or a halogen atom attached to one of the carbon atoms, wherein the reaction is effected in a medium comprising at least one organic solvent in which the monomer is soluble, and in the presence of at least one catalyst soluble in this medium, the monomer and the proportion thereof, being selected so that the polymer or copolymer formed is insoluble in the organic solvent used, the ratio by weight of pigment to resin being from 10/90 to 95.5 and the amount of catalyst being 0.1 to 10% with respect to the weight of the monomer to be polymerised.

Examples of organic solvents which may be used are the aliphatic hydrocarbons such as hexane, heptane, octane, cyclohexane, methylcyclohexane, white spirit, mixtures of those more generally called in industry "gasolines", aromatic hydrocarbons such as benzene, toluene, xylene, halogenated hydrocarbons such as trichloroethylene, perchloroethylene, chlorobenzene, trichlorobenzene, chlorofluoromethanes, chlorofluoroethanes, alcohols such as methanol, ethanol, n-propanol, 1-methyl-ethanol, n-butanol, 2-methylpropanol, 1,1-dimethyl-ethanol, ketones such as 2-propanone, 2-butanone, 4-methyl-2-pentanone, esters such as ethyl acetate, propyl acetate, 1-methyl-ethyl acetate, ethers such as diethyl ether, ethylpropyl ether, tetrahydrofuran, and 1,4-dioxan.

Preferably a quantity of solvent is used which is equal to at least 150% of the weight of the pigment to be coated.

The pigments may be mineral or organic pigments, with the exception of carbon black. Iron oxides, cadmium oranges, chrome yellows, molybdenum red and titanium dioxide may be mentioned as examples of mineral pigments. The organic pigments may belong to a variety of classes such as azo, azomethine, anthraquinone, phthalocyanine or indigoids.

It is advantageous to use the organic pigment in the form of an aqueous paste, such as is obtained during the manufacture of the pigment; by simple kneading this pigment passes from the aqueous phase into the organic phase. It is possible to start from pigment in the powder state but it is then necessary to replace the kneading by a grinding in an organic medium, for example in a sand, bead or pebble mill. In both cases, it is possible to add surface-active substances so as to accelerate either the kneading or the grinding. These surface-active products are of no use for the polymerisation and even constitute a disadvantage when they are employed in too large a quantity.

In order to start the polymerisation reaction a catalyst capable of producing free radicals is used, preferably peroxide compounds such as tert-butyl peroxide, cumene hydroperoxide, tert-butyl hydroperoxide, tert-butyl perbenzoate, di-2,2-(tert-butyldioxy)-butane, tert-butyl peroctoate, benzoyl peroxide, diacetyl peroxide, succinyl peroxide, lauroyl peroxide, tert-butyl perpivalate, 2,4-dichloro-benzoyl peroxide, isopropyl percarbonate, cyclohexyl percarbonate, acetyl-cyclohexane-sulphonyl peroxide, 1,1,4,4-tetramethyl-butylene diperbenzoate, tert-butyl perisononanoate. An azo catalyst such as for example 2,2'-azo-bis (isobutyronitrile), 2,2'-azo-bis-(isovaleronitrile), 2,2'-azo-bis-(methyl-glutaromononitrile), 1,1'-azo-bis-(1-cyanocyclohexane), or 2,2'-azo-bis-(isobutyramidine) may also be used. It is advantageous to use a mixture of two or more catalysts which differ in their "half-life" time, determined at the temperature at which the polymerisation is effected. By half-life time is meant the time at the end of which only half the initial amount of catalyst remains. The amount to be used is preferably from 1 to 5% with respect to the weight of the monomers to be copolymerised.

Examples of monomers which may be used in the process of the invention are the following:

a. alkene-mono- or di-carboxylic acids, preferably the acids containing up to five carbon atoms, for example acrylic, methacrylic, crotonic, maleic, fumaric, itaconic, citraconic, senecioic, oleic or sorbic acid;

b. esters of these acids, such as methyl, ethyl, butyl, 2-methyl-propyl, hexyl, heptyl, 2-ethyl-hexyl, glycidyl, ethyleneglycol or propyleneglycol acrylate or methacrylate, heptyl, lauryl, tridecyl, stearyl or 2-N,N-dimethylamino-ethyl meth-acrylate, N-methyl-2-(2-perfluorohexyl-ethylsulphonylamino)-ethyl acrylate, dimethyl, diethyl, dipropyl, dibutyl maleate or fumarate, dimethyl itaconate, methyl, ethyl, butyl oleate, ethyl, or butyl sorbate, ethyl ricinoleate, methyl acid maleate, octyl acid maleate, butyl acid itaconate, ethyleneglycol dimethacrylate or propyleneglycol dimethacrylate, the acrylates or methacrylates of monoethoxy-polyglycols, or 2-cyano-ethyl acrylate;

c. Anhydrides of alkene-dicarboxylic acids such as maleic anhydride or citraconic anhydride;

d. vinyl esters of saturated aliphatic acids such as vinyl acetate, propionate, 2-methyl-propionate, isovalerate 3,3-dimethyl-butanoate, 3,3- or 3,5- or 5,5-dimethyl-hexanoate or a mixture thereof, 3,3- or 3,5- or 5,7- or 7,7-dimethyl-octanoate or a mixture thereof or vinyl 2,2-dimethyl-octanoate;

e. monomers with a cross-linking action, such as bis-(2-methacryloyloxy-ethyl) acid phosphate, acrylamide, methacrylamide, N-methylol-acrylamide, N-methylolmethacrylamide, tetra-allyloxy-ethane, methylene-bis-acrylamide, glyoxal bis-acrylamide, bis-acrylamidoacetic acid, triallyl phosphite, triallyl phosphate, diallyl terephthalate, diallyl maleate, diallyl oxalate or diallylamine;

f. Other monomers such as allylamine, allyl acetate, allyl hexanoate, allyl ether, allyl bromide, allyl sodium sulphonate, ethylvinylether, butyvinylether, isobutylvinylether, cetylvinylether, octene, di-isobutylene, 2,5-dimethyl-2,4-hexadiene, 1,3,3-trimethoxy-propene, 3-chloro-isobutylene, butadiene, 2-chloro-1,3-butadiene, vinyl chloride, vinylidene fluoride, styrene, trans-stilbene, vinyltoluene, 2-methyl-2-phenyl-ethylene, vinyl phosphate, vinyl phosphonate, 1,2-propylene-di-10-undecenoate, acrylonitrile, 3-amino-crotononitrile, methacrylonitrile, crotononitrile, 2-chloro-acrylonitrile, methylene-glutaronitrile, vinylidene cyanide, vinylpyridine, vinylpyrrolidone, or sodium vinylsulphonate.

The monomer or monomers are selected so that the polymer or copolymer formed is insoluble in the organic solvent or solvents used in the coating, but at least partially soluble in the subsequent media of application.

The quantities of monomers used are such that the ratio by weight of pigment to resin is from 10/90 to 95/5, preferably from 30/70 to 90/10.

The polymerisation is generally effected at a temperature between 50° and 100° C. but it is possible to operate at lower or higher temperatures. For example, the use of a redox catalyst, such as the system benzoyl peroxide-2,3-butane-dione, may be useful to activate the reaction or lower the temperature of polymerisation.

In order to regulate the length of chain and the molecular weight of the polymers entering into the pigment compositions according to the invention, chain transfer agents may be used such as for example alkyl mercaptans (tertio-dodecylmercaptan, n-octylmercaptan), carbon tetrachloride or triphenylmethane.

Finally the polymerisation may be carried out discontinuously (wherein all the monomers are added together) continuously (wherein the monomers are added continuously without interruption), or gradually (wherein the monomers are added a little at a time).

The pigment compositions obtained according to the invention are self dispersible in numerous media in which they are very rapidly dispersed, without grinding, in a homogeneous way in the form of very fine particles; the colouristic yield is then excellent. They may be advantageously used in numerous fields of application, such as the pigmentation of collodions for spinning, inks, plastics materials, paints, creams or other coloured preparations.

The invention is illustrated by the following Examples, in which the parts indicated are parts by weight.

EXAMPLE 1

278 parts of a β-copper phthalocyanine pressed paste containing 64% of water, and 350 parts of heptane are charged into a reactor provided with a condenser and an agitation system. The mixture is mixed by kneading for several hours, then a mixture is introduced into which nitrogen has previously been bubbled, and comprising 80 parts of acrylonitrile, 20 parts of methyl methacrylate, 1 part of tert-butyl perpivalate and 1 part of tert-butyl peroctoate.

The copolymerisation is effected of itself by raising the temperature to 90° C. in a period of 3 hours. When it is finished, the heptane is recovered by distillation. After complete drying, 190 parts of a pigment composition (A1) containing 50% of pigment and 50% of acrylonitrile-methyl methacrylate copolymer (80–20) are thus obtained. This pigment composition is very friable and can be easily converted into powder.

EXAMPLE 2

A mixture of 100 parts of β copper phthalocyanine in powder form and 500 parts of methanol is ground for a night in a rod mill. After a homogeneous dispersion has been obtained, the following ingredients are added:

| | | |
|---|---|---|
| acrylonitrile | 13.5 | parts |
| stearyl methacrylate | 20 | parts |
| tert-butyl perpivalate | 1.5 | parts |
| tert-butyl peroctoate | 1.5 | parts |

After polymerisation as in Example 1, cooling and removal of the organic phase, 125 parts of a pigment composition (B1) are obtained containing 80% of pigment and 20% of acrylonitrile-stearyl methacrylate (40–60) copolymer.

The colouristic development of this pigment composition in autogravure petroleum inks is very rapid. This property can be shown by means of the following test:

In a "Braun" mixer, model M.X. 32, a quantity of pigment composition corresponding to 10 parts of pure pigment is introduced and this is made up to 250 parts by the addition of a white ink in gasoline having the following composition:

| | | |
|---|---|---|
| resinate of lime of colophony from tall oil in 50% solution in gasoline | 120 | parts |
| gasoline C (boiling range 70° C. – 99° C.) | 40 | parts |
| gasoline F (boiling range 100° C. – 160° C.) | 30 | parts |
| toluene | 15.5 | parts |
| butyl phthalate | 10 | parts |

After wetting the solid the mixture is stirred at 11,000 r.p.m. and after 1 minutes stirring a sample is removed, then another after 30 minutes stirring. A film of 0.1 mm thickness is made from each sample, and the trichromatic component Y is measured by means of a "Hardy" spectrophotometric recorder. The colouristic development is evaluated by means of a standardised curve and expressed as a percentage with respect to a control experient (100% after 30 minutes).

The following Table sets out the results obtained with the pigment composition (B1) according to the invention and the same pigment not treated.

| | Colouristic development | |
|---|---|---|
| | After one minute | After 30 minutes |
| Untreated pigment | 33% | 70% |
| Pigment composition (B1) | 93% | 100% |

EXAMPLE 3

Starting from the following products the operation is as in Example 1:

| | | |
|---|---|---|
| pressed paste of pigmentary indanthrone (C.I. 69800) in the alpha form containing 68% of water | 313 | parts |
| heptane | 350 | parts |
| acrylonitrile | 34.4 | parts |
| methyl methacrylate | 8.6 | parts |
| N-oleyl-1,3-propylenediamine dioleate | 1 | part |
| tert-butyl peroctoate | 3 | parts |

136 parts of a pigment composition containing 70% of pigment and 30% of acrylonitrile-methyl methacrylate copolymer (80–20), are obtained.

EXAMPLE 4

The operation is as in Example 1, but only 16 parts of acrylonitrile and 4 parts of methyl methacrylate are used. A pigment composition (A2) containing 85% of pigment and 15% of acrylonitrile-methyl methacrylate copolymer (80–20) is obtained.

The colouristic development of the pigment compositions (A1) and (A2) in the acrylic collodions is very rapid. This property can be shown by means of the following test:

A quantity of pigment composition corresponding to 10 parts of pure pigment, which is then made up to 250 parts by the addition of a 5% solution of an acrylonitrile-methyl methacrylate copolymer (94–6) in dimethyl formamide is introduced into a metal pot. After wetting the solid, the mixture is stirred by means of a "Rayneri" apparatus provided with a stirrer rotating at 1200 rpm. A sample is removed after 1 minute's stirring, then another after 30 minutes stirring. A film 0.1 mm in thickness is produced by means of each sample and its trichromatic component Y is measured by means of a Hardy spectrophotometric recorder. The colouristic development is evaluated by means of a standardised curve and is expressed as a percentage with respect to a control experiment (100% after 30 minutes).

The following Table sets out the results obtained with the pigment compositions (A1) and (A2) according to the invention and with the same pigment not treated.

| PRODUCT | Colouristic development after | |
|---|---|---|
| | 1 minute | 30 minutes |
| Untreated pigment | 23% | 70% |
| Pigment composition A1 | 100% | 100% |
| Pigment composition A2 | 75% | 100% |

EXAMPLE 5

The operation is as in Example 2, but the stearyl methacrylate is replaced by the same quantity of lauryl methacrylate or heptyl methacrylate. Two pigment compositions (B2) and (B3) are thus obtained each containing 80% of β copper phthalocyanine and 20% of an acrylonitrile and lauryl methacrylate copolymer (composition B2) or heptyl methacrylate (composition B3) (40–60).

Like the pigment composition (B1) of Example 2, these pigment compositions (B2) and (B3) have a great rapidity of colouristic development in autogravure petroleum inks.

Moreover, these pigment compositions (B2) and (B3) have a better colouristic yield than that of the same pigment when untreated and dispersed by conventional means, or than that of a pigment composition (c) containing 80% of β copper phtalocyanine and 20% of colophonate, obtained in known way by precipitation of an insoluble colophonate on the pigment particles of β copper phthalocyanine. This fact is shown by means of the following test:

The pigment or the pigment composition to be tested is dispersed in an autogravure petroleum ink of the same composition as that described in Example 2; after application, the colouristic yield is measured expressed in parts of pure pigment, the value 100 being given to the untreated pigment. A value less than 100 corresponds to a better colouristic yield since it needs less pure pigment to obtain the same colouristic intensity; for the same reason a value greater than 100 would indicate a smaller colouristic yield.

The results obtained are set out in the following Table:

|  | Untreated pigment | Pigment composition | | |
| --- | --- | --- | --- | --- |
|  |  | B2 | B3 | C |
| Colouristic yield | 100 | 76 | 76 | 90 |

It is found that the colouristic yield of the pigment compositions B2 and B3 according to the invention is greater by 24% than that of the same untreated pigment, and by 16% than that of the pigment composition C of the prior art.

EXAMPLE 6

A mixture of 100 parts of β copper phthalocyanine in the form of powder and 350 parts of heptane is ground for a night in a rod mill. After a homogeneous dispersion is obtained, the following products are added:

| methyl methacrylate | 90 parts |
| --- | --- |
| acrylic acid | 10 parts |
| tert-butyl perpivalate | 1 part |
| tert-butyl peroctoate | 1 part |

After polymerisation as in Example 1, cooling and elimination of the organic phase, 190 parts of a pigment ¢ composition (D) are obtained containing 50% of pigment and 50% of methyl methacrylate-acrylic acid copolymer (90–10).

This pigment composition is dispersed particularly well in media for packaging autogravure inks. Its colouristic development in a nitrocellulose ink is very rapid. This property may be shown by means of the test described in Example 2 on replacing in the latter the white ink in gasoline by a white nitrocellulose ink having the following composition:

| 50% of nitrocellulose resin in butyl acetate | 86 parts |
| --- | --- |
| ethyl acetate | 210 parts |
| butanol | 22 parts |
| isopropanol | 155 parts |
| butyl phthalate | 28 parts |

The following Table sets out the results obtained in this test.

|  | Colouristic development after | |
| --- | --- | --- |
|  | 1 minute | 30 minutes |
| Untreated pigment | 47% | 80% |
| Pigment composition D | 93% | 100% |

Having regard to its speed of dispersibility, the pigment compositions (D) may be used without any grinding, which is not the case with the untreated pigment.

EXAMPLE 7

The operation is as in Example 6 starting from the following products:

| titanium dioxide, type Anatase | 100 parts |
| --- | --- |
| heptane | 350 parts |
| acrylonitrile | 80 parts |
| methyl methacrylate | 20 parts |
| tert-butyl perpivalate | 1 part |
| tert-butyl peroctoate | 1 part |

190 parts of a pigment composition are obtained which contains 50% of titanium dioxide and 50% of acrylonitrilemethyl methacrylate copolymer (80–20), and disperses very well in the acrylic collodions for spinning.

EXAMPLE 8

One operates as in Example 1 starting from the following products:

| pressed paste containing 70% of water and 30% of the pigment C.I. Yellow 16 (No.2004 0) | 334 parts |
| --- | --- |
| heptane | 350 parts |
| acrylonitrile | 80 parts |
| methyl methacrylate | 20 parts |
| tert-butyl peroctoate | 3 parts |

190 parts of a pigment composition are obtained which contains 50% of pigment and 50% of acrylonitrile-methyl methacrylate copolymer (80–20) and disperses very well in the acrylic collodions for spinning.

EXAMPLE 9

On operating as in Example 6 starting from the products indicated in the following Table, three pigment compositions (A3), (A4) and (A5) are prepared each containing 50% of pigment and 50% of acrylonitrile-methyl methacrylate copolymer (80–20).

| Products used (in parts) | Pigment composition | | |
| --- | --- | --- | --- |
|  | A3 | A4 | A5 |
| Pigment |  |  |  |
| C.I. Pigment green 7 (No. 74260) | 50 |  |  |
| C.I. Pigment yellow 14 (No. 21095) |  | 50 |  |
| Disazo pigment obtained by coupling the tetrazo derivative of a mole of 4,4'-diamino-3,3'-dichlorodiphenyl with two moles on N-acetoacetyl p-chloraniline |  |  | 50 |
| Monomers |  |  |  |
| acronitrile | 40 | 40 | 40 |
| methyl methacrylate | 10 | 10 | 10 |
| Catalysts |  |  |  |
| tert-butyl perpivalate | 0.5 |  |  |
| lauroyl peroxide | 0.5 |  |  |
| diacetyl peroxide |  |  | 0.5 |
| tert-butyl peroctoate | 0.5 |  | 1 |

-continued

| Products used (in parts) | Pigment composition | | |
|---|---|---|---|
| | A3 | A4 | A5 |
| tert-butyl perisononanoate | | | 2 |

The colouristic development of these pigment compositions in the acrylic collodions for spinning is very rapid.

EXAMPLE 10

One operates as in Example 2 starting from the following products:

| β-copper phthalocyanine in powder form | 100 | parts |
|---|---|---|
| methanol | 500 | parts |
| stearyl methacrylate | 20 | parts |
| methyl methacrylate | 5 | parts |
| acrylonitrile | 8.5 | parts |
| tert-butyl perpivalate | 1 | part |
| tert-butyl peroctoate | 1 | part |

A pigmentary composition is obtained which contains 80% of pigment and 20% of stearyl methacrylate-methyl methacrylate-acrylonitrile terpolymer (60-13-27) and which may be used as well in an autogravure petroleum ink as in a fatty ink.

EXAMPLE 11

One operates as in Example 6 starting from the following products:

| β-copper phthalocyanine in powder form | 100 | parts |
|---|---|---|
| cyclohexane | 350 | parts |
| methyl methacrylate | 27 | parts |
| acrylic acid | 12 | parts |
| tert-butyl perpivalate | 1 | part |
| tert-butyl peroctoate | 1 | part |
| N-oleyl-1,3-propylene-diamine-dioleate | 1 | part |

132 parts of a pigmentary composition (E) are obtained which contains 75% of pigment and 25% of methyl methacrylate-acrylic acid copolymer (70-30) and which may be advantageously used in polar medium, such packaging autogravure inks.

The rapidity of colouristic development of this pigmentary composition in an alcoholic ink and in an ink based on soluble polyamides may be shown by means of the test described in Example 2 on replacing in the latter the white ink in gasoline by an alcoholic ink having the following composition:

| white gum lac | 120 | parts |
|---|---|---|
| butyl phthalate | 20 | parts |
| ethanol | 260 | parts | or by an ink based on soluble polyamides having the following composition:

| polyamide resin known by the name of "Versamide 940" | 265 | parts |
|---|---|---|
| isopropanol | 340 | parts |
| gasoline C (boiling range 70° C. – 99° C.) | 165 | parts |
| gasoline F (boiling range 100° C. – 160° C.) | 165 | parts |
| methylisobutyl carbinol | 65 | parts |

The table sets out the results obtained with the pigmentary composition (E) compared with the same pigment untreated:

| | | Colouristic development after | |
|---|---|---|---|
| | | 1 minute | 30 minutes |
| Alcoholic ink | untreated pigment | 47% | 47% |
| | composition (E) | 97% | 100% |
| Ink based on soluble polyamides | untreated pigment | 25% | 46% |
| | composition (E) | 82% | 100% |

EXAMPLE 12

The operation is as in Example 6 starting from the following products:

| pigmentary yellow iron oxide | 100 | parts |
|---|---|---|
| heptane | 350 | parts |
| methyl methacrylate | 80 | parts |
| acrylonitrile | 20 | parts |
| tert-butyl perpivalate | 1 | part |
| tert-butyl peroctoate | 1 | part |

190 parts of a pigmentary composition containing 50% of pigment and 50% of acrylonitrile-methyl methacrylate copolymer (20-80) are obtained. It is easily dispersed in ketonic medium and is compatible with the aromatic amines used for the condensation of the polyurethanes; it is thus very suitable for the colouration in bulk of polyurethanes.

EXAMPLE 13

The procedure is as in Example 1 starting from the following products:

| pressed paste of β copper phthalocyanine containing 64% of water | 278 | parts |
|---|---|---|
| heptane | 350 | parts |
| methyl methacrylate | 27 | parts |
| acrylic acid | 7 | parts |
| tert-butyl perpivalate | 0.75 | parts |
| tert-butyl peroctoate | 0.75 | parts |

127 parts of a pigmentary composition containing 75% of copper phthalocyanine and 25% of methyl methacrylate-acrylic acid copolymer (80-20) are obtained. It is dispersed by simple stirring both in the glycerophthalic paints and in aqueous paints; the films obtained on a solid support are uniformly and regularly coloured.

EXAMPLE 14

The procedure is as in Example 2 starting from the following products:

| β copper phthalocyanine in powder form | 100 | parts |
|---|---|---|
| methanol | 508 | parts |
| stearyl methacrylate | 42 | parts |
| acrylonitrile | 28 | parts |
| tert-butyl perpivalate | 1 | part |
| tert-butyl peroctoate | 1 | part |

A pigmentary composition (F) is obtained containing 60% of pigment and 40% of stearyl methacrylate-acrylonitrile copolymer (60–40). It is particularly suitable for the pigmentation of plastics materials, such as polyvinyl chloride, in which its colouristic development is very rapid, as is shown in the results in the following Table:

|  | Colouristic development | |
|---|---|---|
|  | after 1 minute | after 30 minutes |
| Untreated pigment | 34% | 66% |
| Composition (F) | 94% | 98% |

We claim:

1. A process for the preparation of pigmentary compositions which comprises coating the particles of pigment by means of a polymer of copolymer, by covering by the polymerisation or copolymerisation in situ of at least one ethylenically unsaturated monomer having at least one polymerisable double bond and containing at least three carbon atoms or at least two carbon atoms and a heteroatom and/or a halogen atom attached to one of the carbon atoms wherein the polymerisation or copolymerisation reaction is effected in the absence of any surface-active-compound in a medium comprising at least one organic solvent in which the monomer is completely soluble, and in the presence of at least one polymerisation catalyst soluble in this medium, the monomer and the proportion thereof being selected so that the polymer or copolymer formed is insoluble in the organic solvent used, the ratio by weight of pigment to resin being from 10/90 to 95/5 and the amount of catalyst being from 0.1 to 10% with respect to the weight of the monomer to be polymerised.

2. A process according to claim 1 in which the organic solvent is an aliphatic hydrocarbon, aromatic hydrocarbon, halogenated hydrocarbon, alcohol, ketone, ester or ether.

3. A process according to claim 1 in which the ratio by weight of pigment to resin is from 30/70 to 90/10.

4. A process according to claim 1 in which the organic pigment is used in the form of an aqueous paste.

5. A process according to claim 1 which is effected in the presence of polymerisation activator which is soluble in the reaction medium.

6. A process according to claim 1 in which an acrylic monomer is used.

7. A process according to claim 1 in which a vinyl monomer is used.

8. A process according to claim 1 in which the monomer is selected from the group consisting of acrylic esters, alkene mono or di-carboxylic acids, the nitriles and amides of said acids, the vinyl esters of saturated aliphatic acids containing 1 to 10 carbon atoms, styrene, di-isobutylene and mixtures thereof.

9. A process according to claim 1 in which the solvent is an alcohol containing 1 to 3 carbon atoms or an aliphatic hydrocarbon.

10. A process according to claim 1 in which a peroxide compound is used as catalyst.

11. A process according to claim 1 in which an azo catalyst is used.

12. A process according to claim 1 in which a mixture of catalysts is used.

13. A process according to claim 12 in which the mixture of catalysts comprises catalysts having different half-life times.

14. A process according to claim 6 in which the catalysts are selected from the group consisting of tert-butyl peripivalate, tert-butyl peroctoate, tert-butyl isononanoate, lauroyl peroxide, and diacetyl peroxide.

15. A process according to claim 1 in which the amount of catalyst is 1% to 5% with respect to the weight of monomer to be polymerised.

16. A process according to claim 1 in which the polymerisation is effected at a temperature between 50° and 100° C.

17. Pigmentary composition obtained according to the process of claim 1.

18. Pigmentary composition according to claim 17 in powder form.

* * * * *